United States Patent [19]

Ueno

[11] Patent Number: 4,984,980

[45] Date of Patent: Jan. 15, 1991

[54] MOLD CLAMPING APPARATUS FOR MOLDING MACHINE

[75] Inventor: Toyoaki Ueno, Yamaguchi, Japan

[73] Assignee: Ube Industries, Ltd., Ube, Japan

[21] Appl. No.: 471,948

[22] Filed: Jan. 29, 1990

[30] Foreign Application Priority Data

Jan. 30, 1989 [JP] Japan .................................. 1-20051

[51] Int. Cl.⁵ ...................... B29C 45/67; B29C 45/68
[52] U.S. Cl. ..................................... 425/595; 164/341
[58] Field of Search ......................... 164/341; 425/595

[56] References Cited

U.S. PATENT DOCUMENTS

| 3,606,641 | 9/1971 | Carrieri et al. | 425/595 |
| 3,669,599 | 6/1972 | Snider et al. | 425/595 |
| 4,304,540 | 12/1981 | Hammon | 425/595 |
| 4,865,536 | 9/1989 | Inaba et al. | 425/595 |

FOREIGN PATENT DOCUMENTS 62-66916 3/1877 Japan .
61-246032 11/1986 Japan .

Primary Examiner—Willard Hoag
Attorney, Agent, or Firm—Blakely, Sokoloff, Taylor & Zafman

[57] ABSTRACT

A mold clamping apparatus includes a stationary platen, a movable platen, a driving device, a rotational-linear motion transmission mechanism, a braking device, and a mold clamping force applying mechanism. The stationary platen is arranged on a frame and mounts a stationary metal mold for a molding machine. The movable platen is arranged to oppose the stationary platen to move forward/backward with respect to the stationary platen and mounts a movable metal mold. The driving device moves the movable platen forward/backward with respect to the stationary platen. The rotational-linear motion transmission mechanism is arranged between the driving device and the movable platen and converts a rotational torque of the driving device into a linear motion in a moving direction of the movable platen. The braking device is connected to the driving device and brakes a linear motion of the movable platen toward the stationary platen at the end of the linear motion. The mold clamping force applying mechanism applies a mold clamping force to the movable platen upon braking of the braking device.

8 Claims, 5 Drawing Sheets

MOLD CLAMPING APPARATUS FOR MOLDING MACHINE

BACKGROUND OF THE INVENTION

1. Field of the Invention

The present invention relates to a mold clamping apparatus for a molding machine, for opening/closing or clamping stationary and movable metal molds in a molding machine such as a die casting machine or an injection molding machine.

2. Prior Art

A molding machine such as a die casting machine or an injection molding machine generally comprises two stationary platens having four corners connected by tie bars and a movable platen located between the two stationary platens and supported to be movable forward and backward by the tie bars. A stationary metal mold and a movable metal mold are mounted on one of the stationary platens and the movable platen, respectively. The movable metal mold, which is moved by a hydraulic cylinder directly or via a toggle mechanism and closed with respect to the stationary metal mold, is clamped by a mold clamping cylinder directly or via a toggle mechanism. Thereafter, a molten metal or a molten plastic is injected into a cavity of the metal molds and solidified, thereby manufacturing a molded product.

Such a conventional molding machine, however, has three platens, i.e., two stationary platens and a movable platen. Therefore, if a machine is of a vertical clamping type, the height of the machine is increased. If a machine is of a horizontal clamping type, the total length of the machine is increased.

The present applicant, therefore, has proposed an apparatus having only one stationary platen as disclosed in Japanese Patent Laid-Open No. 61-238456. In this apparatus, tie bars as mold clamping pistons each having a distal end portion connected to a corresponding one of a plurality of cylinders fixed to the stationary platen are inserted to be movable forward and backward in the cylinders. A movable platen is supported by the tie bars via guide bushes and connecting means such as split nuts to be threadably engaged with threaded portions of the guide bushes. A mold opening/closing cylinder is located between the stationary and movable platens. Upon mold clamping, the movable platen is moved by the mold opening/closing cylinder while the split nuts are open, thereby performing mold closing. After the split nuts are closed to connect the movable platen and the tie bars, the mold clamping cylinder is operated to perform mold clamping.

In such a conventional mold clamping machine, however, the split nuts are not smoothly threadably engaged with the threaded portions, resulting in poor operability and uncomfortable noise generated upon engagement. In addition, since the movable platen is supported by the tie bars via the guide bushes, the movable platen tends to be inclined by a gap formed in order to facilitate sliding of the movable platen. As a result, no satisfactory mold clamping precision can be maintained, and burrs are discharged.

In addition, in the conventional mold clamping apparatus for a molding machine, the movable platen is supported by the tie bars via the elongated guide bushes. Therefore, when the movable platen is moved forward/backward by a driving device upon mold opening/closing, supporting portions are sometimes distorted to disable smooth movement For this reason, a large driving force is required. Furthermore, if a high molten metal pressure is generated upon injection of a molten metal or the like into metal molds to slightly distort the movable platen via the metal molds, a stress of the distortion abrades or damages the guide bushes or the tie bars.

SUMMARY OF THE INVENTION

It is an object of the present invention to provide a mold clamping apparatus for a molding machine, which can be made compact as a whole.

It is another object of the present invention to provide a mold clamping apparatus for a molding machine, which has an operability better than that of a conventional apparatus and does not generate noise upon engagement.

It is still another object of the present invention to provide a mold clamping apparatus for a molding machine, which has a mold clamping function better than that of a conventional apparatus.

It is still another object of the present invention to provide a mold clamping apparatus for a molding machine, which can absorb distortion applied on a supporting portion of a movable platen upon injection of a molten metal into metal molds.

In order to achieve the above objects of the present invention, there is provided a mold clamping apparatus for a molding machine, comprising a stationary platen arranged on a frame and mounting a stationary metal mold for the molding machine, a movable platen arranged to oppose the stationary platen to move forward/backward with respect to the stationary platen and mounting a movable metal mold, a driving device for moving the movable platen forward/backward with respect to the stationary platen, a rotational-linear motion transmission mechanism, arranged between the driving device and the movable platen, for converting a rotational torque of the driving device into a linear motion in a moving direction of the movable platen, a braking device, connected to the driving device, for braking a linear motion of the movable platen toward the stationary platen at the end of the linear motion, and a mold clamping force applying mechanism for applying a mold clamping force to the movable platen upon braking of the braking device.

According to the present invention, when the rotational-linear motion transmission mechanism is rotationally driven by the driving device, a rotational motion is converted into a linear motion and transmitted to the movable platen, and mold closing is performed at the end of the linear motion. Upon mold closing, the motion of the movable platen is braked by the braking device, and the mold clamping force applying mechanism operates to perform mold clamping.

In addition, the apparatus according to the present invention further comprises a plurality of rails, arranged on the frame, for supporting the movable platen to be movable forward/backward with respect to the stationary platen, and the rotational-linear motion transmission mechanism includes a plurality of tie bars arranged parallel to the rails and cantilevered by the stationary platen, and a ball screw device mounted on each of the tie bars, the tie bars being arranged to extend through the movable platen, and a groove of the ball screw device being formed in each tie bar, and the driving device is a driving source for rotationally driving the ball screw devices.

In the present invention, when the ball holders are rotationally driven by the driving devices, the movable platen is moved on the tie bars by an action of the ball screws to perform mold closing. Therefore, after the ball holders are braked by brakes so as not to be moved, an oil is supplied to a mold clamping cylinder to connect a disk formed integrally with a piston of the cylinder and the braked ball holders, thereby slightly moving the movable platen to perform mold clamping. After a molten metal is injected into the mold cavity and solidified, an oil is supplied to a mold clamping release chamber of the mold clamping cylinder to release mold clamping. Then, after the braking operation of the brake device is stopped to render the ball holders movable, the ball holders are rotationally driven by the driving device. Thus, the movable platen is moved on the tie bars to open the molds.

BRIEF DESCRIPTION OF THE DRAWINGS

FIGS. 1 to 5 show an embodiment in which a mold clamping apparatus for a molding machine according to an embodiment of the present invention is applied to a horizontal mold clamping and vertical casting die casting machine, in which:

FIG. 1 is a side view showing the die casting machine,

FIG. 2 is a partially cutaway front view of the die casting machine taken along line II—II in FIG. 1, FIG. 3 is a view showing a left half portion of the die casting machine taken along line III—III in FIG. 2 and its right half portion viewed in a direction indicated by an arrow A' in FIG. 2, FIG. 4 is an enlarged longitudinal sectional view showing a ball screw and a movable platen end portion, and FIG. 5 is a sectional view showing a linear guide from which a cover is removed.

DETAILED DESCRIPTION OF THE PREFERRED EMBODIMENT

Figure 1:
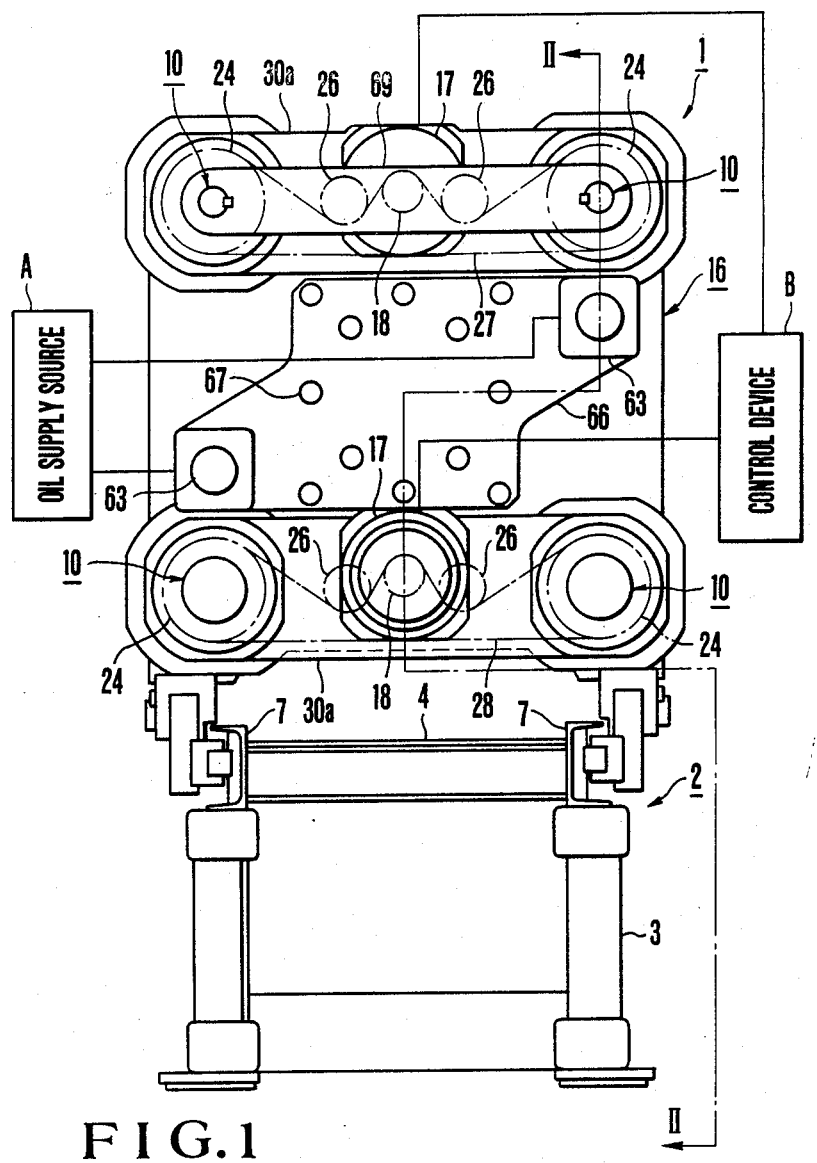
Figure 2:
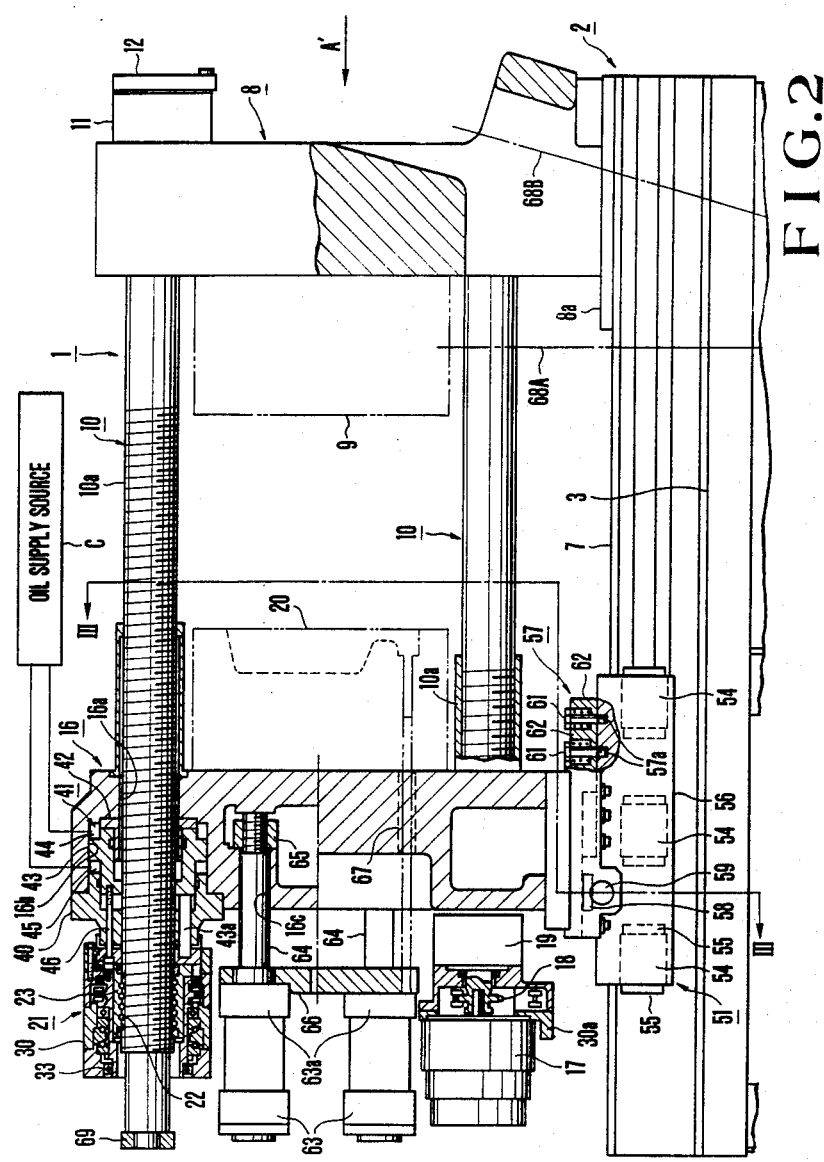
Figure 3:
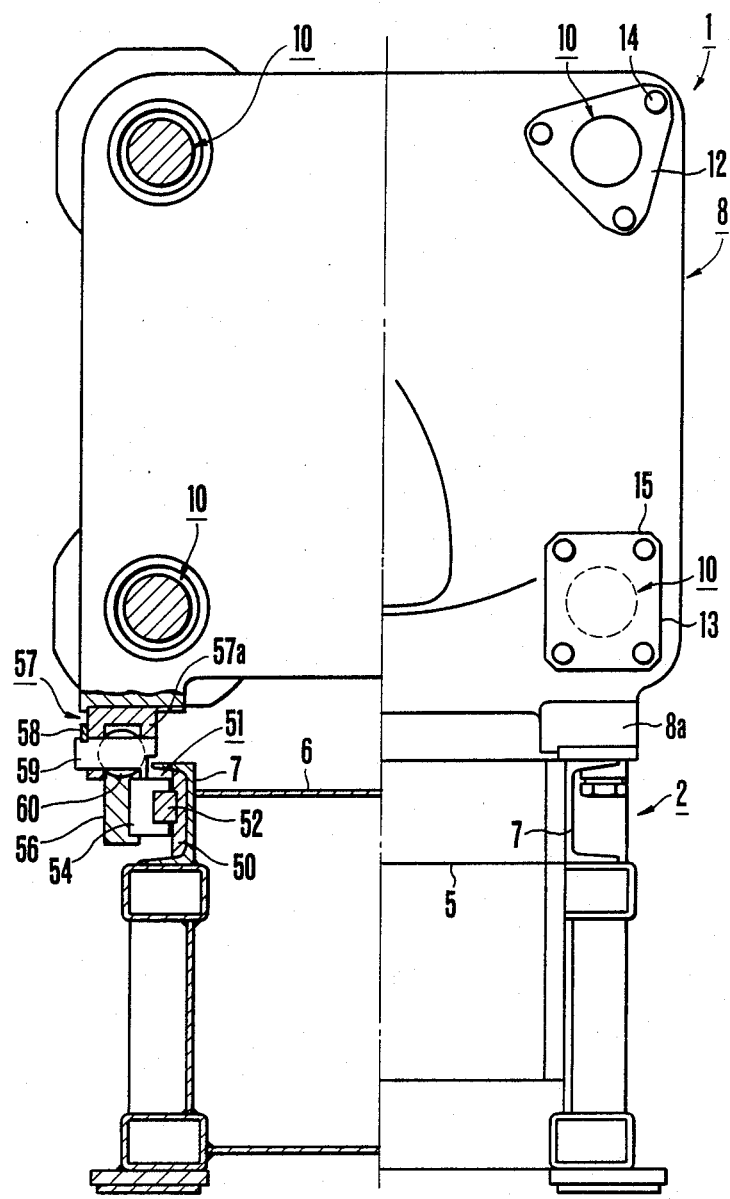
Figure 4:
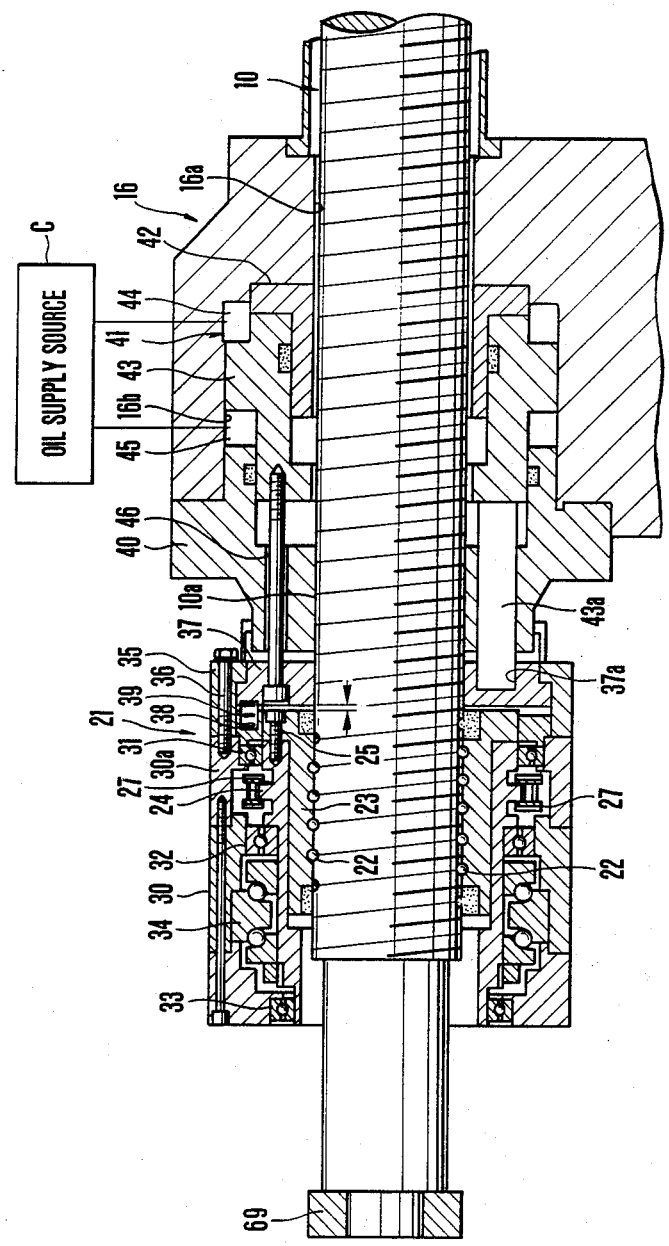
Figure 5:
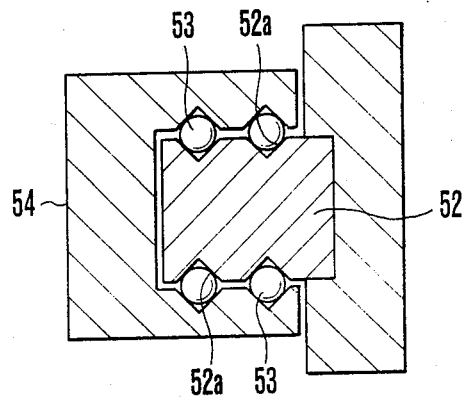

FIGS. 1 to 5 show an embodiment in which a mold clamping apparatus for a molding machine according to the present invention is applied to a horizontal clamping/vertical casting die casting machine. FIG. 1 shows a side of the die casting machine, FIG. 2 shows a partially cutaway front of the die casting machine taken along line II—II in FIG. 1, FIG. 3 shows a left half portion of the die casting machine taken along line III—III in FIG. 2 and its right half portion viewed in a direction indicated by an arrow A' in FIG. 2, FIG. 4 shows an enlarged longitudinal section of a ball screw and a movable platen end portion, and FIG. 5 shows a front of a linear guide from which a cover is removed.

Referring to FIGS. 1 to 5, a die casting machine 1 includes a frame generally denoted by reference numeral 2. The frame 2 is integrally formed by a frame main body 3 framed to have an elongated rectangular shape extending throughout the total length of the machine and a pair of right and left rails 7 supported on the upper end portions of the frame main body 3, having a plurality of portions connected by connecting members 4, 5, and 6, and having U-shaped sections. A stationary platen 8 having a substantially square front shape is fixed to the rear end portions of the rails 7 via a base plate 8a. A stationary metal mold 9 is detachably mounted on the inner surface of the stationary platen 8.

One end of each of tie bars 10 extending throughout the total length of the machine is inserted in a corresponding one of tie bar holes formed at four corners of the stationary platen 8. The tie bars 10 are strongly fixed to and cantilevered to be parallel to the rails 7 by the stationary platen 8 by using nuts 11 threadably engaged with projecting threaded portions of the stationary platen 8, fixing plates 12 and 13, and bolts 14 and 15. Reference numeral 16 denotes a movable platen supported by the rails 7 of the frame 2 by a supporting mechanism (to be described later) so as to move close to or away from the stationary platen 8. The tie bars 10 are inserted in tie bar holes 16a formed at four corners of the movable platen 16. A pair of upper and lower motors 17 located at a central portion in the widthwise direction on the outer surface of the movable platen 16 and rotating in synchronism with each other under the control of a control device B (see FIG. 1) are fixed to connecting plates 30a integrally connecting cases 30 of right and left ball screw devices 21 (to be described later). Reference numeral 18 denotes a sprocket rotatably supported by a motor shaft of each motor 17. Reference numeral 19 denotes a disconnectable-clutch brake as a braking device connected to each motor 17 to brake rotation of the motor. A movable metal mold 20 is mounted on the surface of the movable platen 16 opposing the stationary platen 8 so as to oppose the stationary metal mold 9.

A threaded portion 10a for a ball screw is formed on each tie bar 10. A ball screw device as a rotational-linear motion transmission mechanism generally denoted by reference numeral 21 and including the threaded portion 10a is mounted on a portion of the threaded portion 10a projecting from the movable platen 16. The ball screw device 21 includes the threaded portion 10a, a plurality of balls 22 to be engaged with and roll in grooves of the threaded portion 10a, and a cylindrical ball holder 23 having spherical holes for supporting the balls 22. A sprocket 24 having an elongated cylindrical boss is fitted on the outer circumferential surface of the ball holder 23 and connected to the ball holder 23 by a bolt 25. Each of upper and lower chains 27 and 28 kept taut by idlers 26 is looped between the sprockets 24 and the sprocket 18 of the motor 17. When the upper and lower motors 17 and the ball holders 23 connected to the motors 17 rotate in synchronism with each other, the four sprockets 24 rotate in synchronism therewith, and the balls 22 and the grooves of the threaded portions 10a are engaged with each other. As a result, the four ball holders 23 rotate and move forward/backward on the tie bars 10 in synchronism with each other. The case 30 having right and left parts connected by the connecting plate 30a is fitted on the outer circumferential surface of the boss portion of each sprocket 24 via bearings 31, 32, and 33 and a thrust bearing 34, thereby rotatably supporting the sprocket 24. A cylindrical holder 35 is fixed at the end face of the case 30 by a bolt 36. Reference numeral 37 denotes a ring-like disk slidably fitted adjacent to the ball holder 23 on the tie bar 10. The movement in one direction of the disk 37 is regulated by an inner flange of the holder 35. An annular spring holder 38 is inserted in a space defined between the disk 37 and the case 30 so as to be brought into contact with the holder 35. Compression coil springs 39 are inserted in a plurality of spring holes formed in the end face of the spring holder 38. Each compression spring 39 biases the disk 37 to form, e.g., a 1-mm wide gap indicated by reference symbol t in FIG. 4 between the disk 37 and the ball holder 23.

Cylinder holes 16b corresponding to the ball screw devices 21 are formed to be concentrical with the tie bars 10 at four corners of the movable platen 16. An opening end of each cylinder hole 16b is closed by a cover member 40. A mold clamping cylinder generally denoted by reference numeral 41 is provided in each cylinder hole 16b by connecting the movable platen 16 and the ball holder 23 of the ball screw device 21. That is, the mold clamping cylinder 41 includes a cylindrical cylinder bush 42 with a flange fitted in a bottom portion of the cylinder hole 16b and a piston 43 slidably fitted on the outer circumferential surface of the cylinder bush 42 and slidably fitted on the inner circumferential surfaces of the cylinder hole 16b and the cover member 40. A head end chamber 44 and a rod end chamber 45 are separately formed by the flange of the piston 43 in the cylinder hole 16b and connected to a hydraulic device (not shown). A plurality of urging rods 43a project from a part of the rear surface of the piston 43 and slidably extend through a hole formed in the cover member 40. The distal end face of each rod 43a is brought into tight contact with the bottom surface of a hole 37a formed in the front surface of the disk 37. The piston 43 and the disk 37 are connected by a bolt 46 extending through a bolt hole of the cover member 40. When the ball screw device 21 moves forward/backward while the piston 43 is not hydraulically operated, the movable platen 16 connected by the bolt 46 and the like moves forward/backward, thereby opening/closing the movable metal mold 20 with respect to the stationary metal mold 9. When an oil is supplied to the head end chamber 44 of the cylinder 41 while the metal molds are closed and the ball screw device 21 is stopped by the brake 19, the piston 43 moves backward along the tie bar 10 to urge the disk 37 against the ball holder 23 via the rods 43a. Thereafter, the movable platen 16 slightly moves forward to perform mold clamping. Upon mold clamping, the compression coil springs 39 are compressed by the disk 37 to eliminate the gap t, and the disk 37 is urged against the ball holder 23 by a mold clamping counterforce.

A supporting mechanism of the movable platen 16 with respect to the frame 4 will be described below. An elongated plate 50 is welded to an inner portion of each of the right and left rails 7 of the frame 2, and a linear guide generally denoted by reference numeral 51 is mounted on the plate 50. The linear guide 51 basically has a bearing structure constituted by a rail 52 which is an elongated bar member having a substantially square section, fitted in a groove formed in the plate 50, and having upper and lower endless ball grooves 52a, a plurality of balls 53 aligned substantially in contact with each other to roll in the upper and lower ball grooves 52a, a plurality of (in this embodiment, three) U-shaped ball holders 54 for rotatably holding the balls 53 in the endless ball grooves 52a, and covers 55 fixed to both the end faces of the ball holder 54. The three ball holders 54 are connected by a horizontally elongated rectangular plate 56 fixed to their side surfaces. A shoe 57 including a second half portion having an inverted U-shaped section and a first half portion having a rectangular section and having a rectangular planar shape is fixed to each of right and left lower end faces of the movable platen 16 such that an inverted U-shaped portion 57a is engaged with the plate 56. A pin 59 is inserted in a pin hole of an engaging portion such that its rotation is stopped by a stopper 58. A spherical member 60 is rotatably fitted in the pin 59 such that its surface is engaged with a spherical recess formed in the plate 56. That is, the shoe 57 formed integrally with the movable platen 16 can rock about the pin 59. A plurality of spring holes 57a are formed in a portion having a rectangular section near the front end portion of the shoe 57. A bolt 61 having a head smaller than the diameter of the spring hole is inserted in each spring hole 57a. A threaded portion of each bolt 61 is threadably engaged with a screw hole of the plate 56. A compression coil spring 62 is inserted between the head of each bolt 61 and a spring end seat surface as the bottom surface of a corresponding spring hole 57a. The compression coil spring 62 is compressed when the front end portion of the shoe 57 is slightly raised upon injection. With this arrangement, the balls 53 of each linear guide 51 roll in the ball grooves to smoothly move the movable platen 16 forward/backward in a normal state. When the movable platen 16 is distorted by a high injection pressure applied to the movable metal mold 20 upon injection after mold clamping, each shoe 57 rocks counterclockwise in FIG. 2 while compressing the compression coil springs 62, thereby absorbing the distortion. Therefore, the distortion is not transmitted to the linear guide 51.

An operating end of a piston rod 64 of a push-out cylinder 63 is fixed in each of a pair of rod holes 16c formed at diagonal positions of the movable platen 16 (see FIG. 2) by a nut 65. A push-out plate 66 is fixed to cylinder portions 63a of the two cylinders 63 to connect these cylinders 63. A plurality of push-out pins 67 extend through pin holes of the movable platen 16 so that their proximal end portions 67a are fixed to the push-out plate 66 and their distal end portions are movably inserted in pin holes 20a formed in the movable metal mold 20 (see FIG. 2). When an oil is supplied from an oil supply source A (see FIG. 1) to the push-out cylinders 63 to move their cylinder portions 63a forward, the push-out pins 67 move forward to push out a product solidified in the cavity of the movable metal mold.

An injection device is located below the stationary metal mold 9 and pivoted between a standing position having a central line indicated by an alternate long and short dashed line 68A and a tilt position indicated by an alternate long and short dashed line 68B. A molten metal injected in an injection sleeve at the tilt position is injected into the cavity in the clamped metal molds 9 and 20 at the standing position.

Reference numeral 69 denotes a connecting plate for connecting the distal end portions of the two upper tie bars 10. The connecting plate 69 regulates rotation of the tie bars 10. When large metal molds 9 and 20 which cannot be passed between the two tie bars 10 are to be mounted, the fixing plates 12 and the nuts 11 of these tie bars 10 are removed to pivot the ball screws 21, the tie bars 10 are moved by a long distance, and the metal molds 9 and 20 are removed upward. For this purpose, the threaded portion 10a of each upper tie bar 10 is formed to be longer than that of each lower tie bar.

An operation of the die casting machine having the above arrangement will be described below. When the upper and lower motors 17 are started in synchronism with each other under the control of the control device B shown in FIG. 1 while the metal molds are open as shown in FIG. 2, the four sprockets 24 of the ball screw devices 21 operatively connected by the motors 17 via the chains 27 and 28 rotate in synchronism therewith, and the ball holders 23 connected to the sprockets 24 rotate. As a result, the ball screw devices 21 move while the balls 22 roll in the grooves of the tie bars 10. Since the mold clamping cylinders 41 are stopped in this state, the movable platen 16 connected to the ball screw devices 21 by the bolts 46 moves toward the stationary platen 8. At this time, the compression coil springs 39 are extended, and the gap t is present. The movable platen 16 can smoothly move since, in addition to the ball screw devices 21, the pair of right and left linear guides 51 are provided between the shoes 57 connected to the movable platen 16 and the rails 7 of the frame 2 and their balls 53 roll in the ball grooves 52a. In addition, since the ball screw devices 21 as the tie bar 10 holding portions corresponding to nuts in a conventional machine are not separated from but always follow the movable platen 16, a parallel degree of the movable platen 16 can be held, and no tie bar guide is required.

When the movable metal mold 20 is brought into contact with the stationary metal mold 9 upon movement of the movable platen 16 to perform mold closing or moves to a state immediately before mold closing, the motors 17 are stopped under the control of the control device B, and their rotation is braked by the brakes 19. As a result, since the ball screw devices 21 are stopped, further movement of the case 30 toward the stationary platen 8 is stopped. In this state, an oil is supplied from an oil supply source C (see FIG. 2 or 4) to the head end chamber 44 of the mold clamping cylinder 41. The pistons 43 move (to the left in FIG. 2 or 4) toward the ball screw devices 21, and the rods 43a push the disk 37 backward. At this time, the compression coil springs 39 are compressed, and the movable platen 16 slightly moves toward the stationary platen 8 after the disk 37 is brought into contact with the ball holders 23, thereby performing mold clamping for the stationary metal mold 9. Also in this case, since the ball screw devices 21 have high precision and are positioned close to the movable platen 16, the parallel degree of the movable metal mold 20 is held. Therefore, since mold clamping precision is improved, no burr is discharged from a gap between the metal molds 9 and 20. Note that the disk 37 and the ball holders 23 are urged against each other by a mold clamping counterforce to produce a friction force. Therefore, the ball holders 23 or the ball screw devices 21 do not pivot on the tie bars 10 due to the friction force together with a braking force of the brake 19 even if they are pushed.

After mold clamping is performed as described above, the injection device is tilted to inject a molten metal in its injection sleeve. The injection device is then set upright to connect the injection sleeve to a stationary sleeve of the stationary metal mold 9. In this state, a plunger tip of the injection cylinder is moved forward to inject the molten metal into the cavity in the metal molds 9 and 20, and the injected molten metal is solidified to be a molded product.

Note that the central portion of the movable platen 16 is pushed and distorted (to the left in FIGS. 2 or 4) slightly more strongly than the upper and lower end portions thereof by a pressure of the molten metal upon injection, and a stress of distortion acts on the supporting portion constituted by the frame 2 for the movable platen 16. In this apparatus, the stress of distortion acts on the shoes 57, and the shoes 57 pivot the spherical members 60 and rock about the pins 59 while compressing the compression coil springs 62. Therefore, the distortion is absorbed but does not reach the linear guides 51.

When an oil is supplied to the rod end chamber 45 of the mold clamping cylinder 41 after the product is solidified, the movable platen 16 slightly moves away from the stationary platen 8 to open the molds. In this case, since a biasing force of the compression coil springs 39 acts as a mold opening force, the molds can be easily opened. After mold opening, the brakes 19 are released, and the upper and lower motors 17 are rotated in an opposite direction in synchronism with each other under the control of the control device B. As a result, the ball screw devices 21 and the movable platen 16 move on the tie bars 10 due to an action of the ball screw devices 21, thereby widely opening the movable metal mold 20 with respect to the stationary metal mold 9. In this case, the product in the cavity is held by the movable metal mold 20. Therefore, an oil is supplied to the rod end sides of the push-out cylinders 63 to move their cylinder portions forward, thereby moving the push-out plate 66 connected to the cylinder portions forward. As a result, the product in the cavity is pushed out by the push-out pins 67 and removed from the machine, and the casting operation is ended.

In order to replace the metal molds 9 and 20, the fixing plates 12 and the nuts 11 are removed, and only the upper motor 17 is started. As a result, the two upper tie bars 10 are simultaneously extracted from the stationary platen 8 and moved by a long distance by an action of the ball screw devices 21. Therefore, the metal molds 9 and 20 can be removed upward, and large metal molds can be mounted.

Note that the pistons of the four mold clamping cylinders 41 are normally driven in synchronism with each other at the same pressure. A pressure to be applied to one or two pistons 43, however, may be arbitrarily changed to partially change the mold clamping force acting on the movable platen 16 or the movable metal mold 20, thereby preventing a burr from being discharged from one portion of the metal molds.

In the above embodiment, the ball screw device 21 is exemplified as a rotational-linear motion transmission mechanism for transmitting the motion of the driving device to the movable platen. The ball screw device 21, however, may be a normal screw device including a screw shaft and a nut to be threadably engaged with the screw shaft or a transmission mechanism constituted by a rack and a pinion. If the ball screw device or normal screw device is used, either the screw shaft side or the ball holder or nut side may be rotationally driven. In this case, a power generating device for moving the movable platen 16 may be used to move the screw shaft and the ball holder or nut upon movement of the movable platen 16. In addition, in order to maintain the parallel degree of the movable platen 16, the four upper right, upper left, lower right, and lower left tie bars 10 may be rotationally driven in synchronism with each other. In this case, in order to remove the upper tie bars, a device for stopping rotation of the two lower tie bars must be provided.

Furthermore, in the above embodiment, the present invention is applied to the horizontal clamping/vertical casting die casting machine. The present invention, however, may be applied to a vertical clamping die casting machine or various types of plastic injection molding machines to achieve the same effects.

Figure 6:
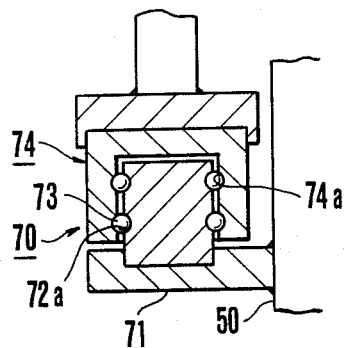
FIG. 6 is a side view showing a modification of the linear guide.

FIG. 6 shows a modification of the linear guide from which a cover is removed. A linear guide 70 of this modification comprises a receiving plate 71 welded to a plate 50 fixed to the rail 7 described above, a rail 72 fitted in a groove of the receiving plate 71 and having endless ball grooves 72a formed in both the side surfaces of the rail 72 to extend along the moving direction of the movable platen 16, a plurality of balls 73 aligned in substantially contact with each other in the ball grooves 72a, a plurality of inverted U-shaped ball holders 74 for rotationally holding the balls 73 by endless ball grooves 74a thereof, and a cover (not shown) fixed to both the end faces of the linear guide 70. A plurality of ball holders 74 are connected by a plate 76 having an inverted T-shaped section. An inverted U-shaped portion of the shoe 57 described above is pivotally supported by the plate 76. With this arrangement, the movable platen 16 can smoothly move forward/backward since the balls 73 of the linear guide 70 roll in the ball grooves 72a and 74a, as in the first embodiment.

As is apparent from the above description, the injection molding mold clamping apparatus according to the present invention comprises the rotational-linear motion transmission mechanism for transmitting the motion without releasing the engagement of a transmission system inserted between a driving device and a movable platen, the braking device connected to the driving device and brakes its linear motion at the end of the linear motion, and the mold clamping force applying mechanism operated upon braking of the braking device to apply a mold clamping force to the movable platen. Therefore, the entire apparatus can be made compact. In addition, unlike in a conventional apparatus, no split nut is used, and the engagement of the transmission system is not released. Therefore, the operability is improved, and no noise is generated due to the engagement.

In addition, in the present invention, a plurality of tie bars each having one end fixed to a stationary platen are used, and a ball screw device having ball holders is provided on the outer circumferential surface at the other end of each tie bar. A disconnectable brake is connected to a rotary driving device of each ball screw device, mold clamping cylinders are mounted on the movable platen, and a disk interlocked with the motion of pistons of the cylinders is formed to be brought into contact and separated from the ball holders. Therefore, the entire apparatus can be made compact. In addition, unlike in a conventional apparatus, no guide bush is used between the movable platen and the tie bars, and balls of the ball screw device provided between the movable platen and each tie bar roll in ball grooves upon mold closing, mold clamping, and mold opening. Therefore, the movable platen can move smoothly to improve the mold clamping function. Furthermore, since the ball holders of the ball screw devices holding the tie bars are not separated from but always follow the movable platen, the parallel degree of the movable platen is maintained to prevent discharge of burrs, thereby improving the mold clamping function. Since no split nut need be used unlike in a conventional apparatus, the operability is improved. Moreover, in order to mount large metal molds, the tie bars can be rotated and removed by utilizing motors of the ball screw devices to remove the metal molds upward, resulting in an easy operation with less labors.

What is claimed is:

1. A mold clamping apparatus for a molding machine, comprising:

a stationary platen arranged on a frame and mounting a stationary metal mold for the molding machine;

a movable platen arranged to oppose said stationary platen to move forward/backward with respect to said stationary platen and mounting a movable metal mold;

a driving device for moving said movable platen forward/backward with respect to said stationary platen;

a rotational-linear motion transmission mechanism, arranged between said driving device and said movable platen, for converting a rotational torque of said driving device into a linear motion in a moving direction of said movable platen;

a braking device, connected to said driving device, for braking a linear motion of said movable platen toward said stationary platen at the end of the linear motion; and a mold clamping force applying mechanism for applying a mold clamping force to said movable platen upon braking of said braking device.

2. An apparatus according to claim 2, further comprising a plurality of rails, arranged on said frame, for supporting said movable platen to be movable forward/backward with respect to said stationary platen, wherein said rotational-linear motion transmission mechanism includes:

a plurality of tie bars arranged parallel to said rails and cantilevered by said stationary platen; and a ball screw device mounted on each of said tie bars, said tie bars being inserted through said movable platen, and a groove of said ball screw device being formed in each tie bar, and said driving device is a driving source for rotationally driving said ball screw devices.

3. An apparatus according to claim 2, wherein said driving source of said driving device is a motor, and said braking device is a clutch brake mounted on said motor.

4. An apparatus according to claim 2, wherein said mold clamping force applying mechanism includes:

mold clamping cylinders each mounted on a tie bar insertion portion of said movable platen and having a piston connected to said ball screw device; and an oil supply source for hydraulically controlling said cylinders to generate the mold clamping force for urging said movable platen against said stationary platen, each of said pistons being movable along a corresponding one of said tie bars.

5. An apparatus according to claim 4, wherein each of said ball screw devices includes:

balls to be engaged with a groove formed in said tie bar;

a ball holder for holding said balls;

a disk member arranged to be separated from said ball holder;

a compression coil spring arranged between said ball holder and said disk member; and a case for covering each of said balls, said ball holder, said disk member, and said compression coil spring and regulating movement of said disk member toward said movable platen.

6. An apparatus according to claim 1, wherein said movable plate includes:

shoes formed at a lower portion of said movable platen in correspondence with said rails and separated from said rails; and linear guides, arranged between said shoes and said rails, for moving said movable platen along said rails, each of said linear guides including:

guide grooves arranged and fixed along said rail and formed parallel to said rail;

a plurality of balls for rolling in said guide grooves; and ball holders, connected to said shoe, for holding said balls.

7. An apparatus according to claim 6, further comprising:

connecting members arranged between said shoes and said ball holders; and compression coil springs and coupling members for rockably coupling said connecting members and said shoes.

8. An apparatus according to claim 7, wherein said shoe has an inverted U-shaped portion, and said apparatus further comprises a pin member for coupling said connecting member and said inverted U-shaped portion so that said inverted U-shaped portion is sandwiched therebetween.

* * * * *